W. B. Hayden,

Welding Chain Links.

No. 107,613.  Patented Sep. 20, 1870.

Witnesses.  Inventor

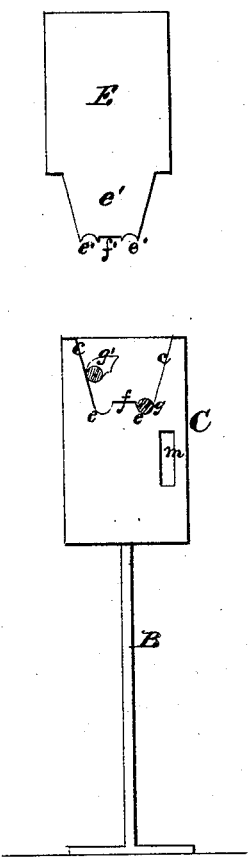
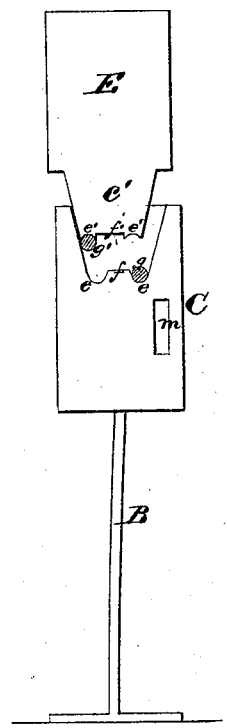
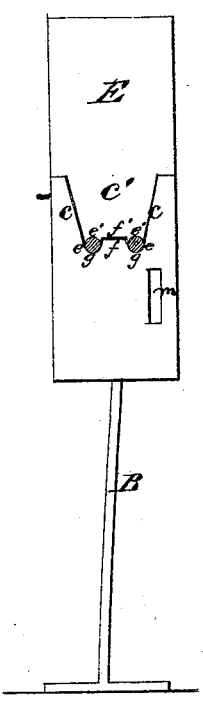
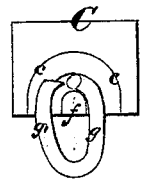
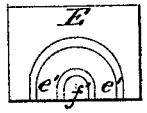

UNITED STATES PATENT OFFICE.

WILLIAM B. HAYDEN, OF COLUMBUS, OHIO.

IMPROVEMENT IN MACHINES FOR WELDING CHAIN-LINKS.

Specification forming part of Letters Patent No. 107,613, dated September 20, 1870.

*To all whom it may concern:*

Be it known that I, WILLIAM B. HAYDEN, of Columbus, in the county of Franklin and State of Ohio, have invented a new and Improved Machine for Welding Links in the operation of making chains; and I do hereby declare that the following is a full, clear, and exact description thereof, reference being had to the accompanying drawing, making part of this specification, in which—

Figure 1:
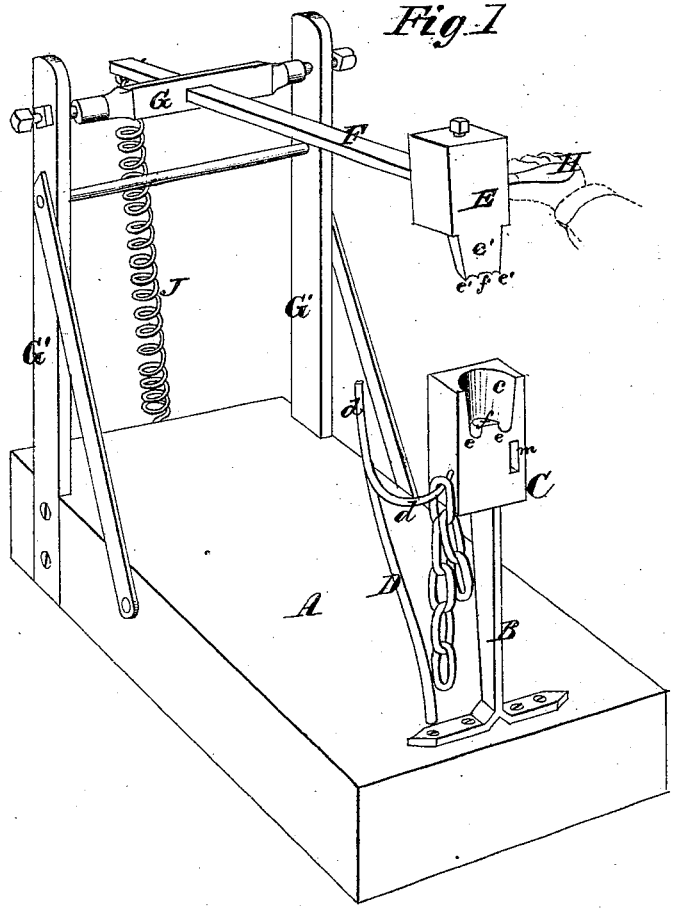
Figure 2:
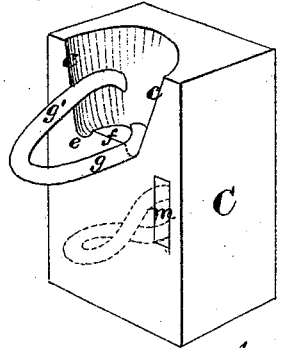

Figure 1, Plate 1, is a perspective view of the improved machine. Fig. 2, Plate 1, is a perspective view of the lower die, showing an open link in place for being lapped and welded. Figs. 3, 4, 5, 6, and 7, Plate 2, are views of the dies, showing the various stages through which an open link passes before it is welded.

Similar letters of reference indicate corresponding parts in the several figures.

The method hitherto generally adopted in the manufacture of chains, which are not entirely made by machinery, is to lap and weld the end of the links upon an anvil by means of a hammer. This requires very experienced and skillful workmen to make good chains, and the operation is very slow and laborious.

The object of my invention is to facilitate the work of lapping and welding link-blanks which have been previously cut and bent, and to produce chains the links of which shall be uniform in shape, size, and weld.

In carrying this invention into effect the principal features employed are, a die-bed, which will yield laterally through its flexible support, and accommodate itself to a hammer-die, when this latter is forcibly brought down upon it, in combination with a vertically-reciprocating hammer-die, said parts being so constructed and arranged that links adjusted upon the die-bed will, by the repeated blows of the hammer upon them, be lapped, welded, and swaged into the shape required, as will be hereinafter explained.

To enable others skilled in the art to understand my invention, I will explain its construction and operation.

In the accompanying drawing, A represents a solid foundation, from which rises a laterally-yielding elastic standard, B, which is secured down firmly to the foundation A, and adapted to suspend the female die-bed C, as shown in Fig. 1. This die-bed C may be secured to the standard, in such manner as to be readily removable therefrom when it is desired to change one die-bed for another for producing chains of different sizes and shapes. Into the upper end of the die-bed a cavity is formed having upwardly-flaring sides $c$. The top and front of this cavity are open, as shown in the drawing, and its bottom presents a groove, $e$, corresponding in shape and size to the ends of the links to be welded and shaped in it. The internal elevation $f$ at the bottom of the flaring cavity $c$ forms a kind of core, for receiving around it the end of a link in process of being welded.

The oblong recess $m$, made into the front of the die-bed C, is intended to receive and hold the ends of links, as indicated in dotted lines, Fig. 2, while making twisted-link chains.

Above the die-bed C is a die-hammer, E, having formed on its bottom a tapering male portion, $c'$, which is adapted to fit into the flaring cavity $c$ or the female portion of the die-bed C. The bottom of the tapering portion $c'$ is grooved at $e'$, recessed at $f''$, and otherwise adapted to form the upper half of the die, the grooves $e$ and its internal elevation $f$ being adapted to form the lower half of the die. When the two parts forming the die are brought together, as shown in Fig. 7, Plate 2, the space left between them by the grooves $e$ $e'$ corresponds exactly in shape and size to the shape and size of the ends of the links for which said two parts are adapted for welding.

The hammer-die E is provided with a handle, H, and is applied to the free end of a vibrating arm, F, so as to vibrate vertically. The arm F is adjustably secured to a cross-head, G, which rocks freely on bearings applied to standards G' G'.

The spring J, which is applied to the rear extension of the hammer-arm F, operates to lift the hammer-die, and hold it above the die-bed, when it is not forcibly brought down by the hand of the workman placed on the handle H.

On one side of the die-bed C, and rising from the foundation A, is a standard, D, terminating upwardly in horns $d$, which are intended for holding the finished chain in a convenient position to the hand of a person working at the machine.

In Fig. 2 I have represented a link-blank adjusted in place upon the base of the die-bed C, for being lapped, welded, and shaped. It will be seen that one portion, $g$, of the blank lies in part of the groove $e$, and that the other portion, $g'$, extends considerably above the bottom of the flaring cavity $c$, and is spread outward. It will now be understood that, if the male portion $c'$ of the hammer-die E was arranged in the same vertical plane with the die-bed C, and the flaring portion of the latter was omitted, the lapping of portion $g'$ over $g$ could not be effected. I, therefore, arrange the hammer-die E a little to one side of a vertical plane passing centrally through the die-bed, as shown in Fig. 3, so that, as this hammer-die strikes and drives down the raised portion $g'$ of the link, the flaring side $c$ of the die-bed will force this portion of the link toward and cause it to overlap the portion $g$ of the link.

The yielding standard B will allow the die-bed to move laterally and accommodate itself to the male portion $c'$ of the hammer-die every time the latter enters the flaring cavity in the die-bed.

It is obvious that the die-bed C might be rigidly fixed, and the hammer-die allowed a lateral as well as a vertical movement. It is also obvious that, by properly-formed dies, rings as well as chain-links can be welded, as above described for welding links.

I claim as my improvement in devices for welding chain-links—

1. The construction and arrangement jointly of the bed-die, with lateral walls projected upward and outward, similar to those of a funnel, and the counter-die for operating in conjunction therewith to deliver blows upon the blank in the indirect manner set forth—that is to say, by contact, first, with the inner surface of the wall of the bed-die, at one side of and some distance above the blank, and then, following the inclination of the wall, upon the blank itself, the object being to force that end of the blank which is uppermost in toward the core or frog of the bed-die at the moment when the interpenetration of the metal of one end of the blank by that of the other takes place.

2. The arrangement of the bed-die upon the flexible standard, and its location relative to the direction of the movement of the counter-die, as described—that is to say, its axis not coincident with, but a little removed laterally from, the plane of movement of the axis of the counter-die.

WM. B. HAYDEN.

Witnesses:
JOHN H. MARTIN,
JNO. G. MILLER.